(12) United States Patent
Kihara

(10) Patent No.: US 7,508,560 B2
(45) Date of Patent: Mar. 24, 2009

(54) HOLOGRAPHIC RECORDING DEVICE AND HOLOGRAPHIC RECORDING METHOD

(75) Inventor: Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 219 days.

(21) Appl. No.: 11/487,746

(22) Filed: Jul. 17, 2006

(65) Prior Publication Data
US 2007/0019268 A1 Jan. 25, 2007

(30) Foreign Application Priority Data
Jul. 19, 2005 (JP) ............................. 2005-208817

(51) Int. Cl.
*G03H 1/26* (2006.01)
*G03H 1/00* (2006.01)
(52) U.S. Cl. .......................................... 359/22; 359/30
(58) Field of Classification Search .................... 359/11, 359/21, 22, 24, 30
See application file for complete search history.

(56) References Cited

U.S. PATENT DOCUMENTS 3,635,538 A * 1/1972 Caulfield et al. ................ 359/7
3,819,248 A * 6/1974 Takeda et al. ................. 359/21
2005/0207313 A1* 9/2005 Handschy et al. ........... 369/103

FOREIGN PATENT DOCUMENTS

WO  WO2005/057559  * 6/2005

* cited by examiner

*Primary Examiner*—Alessandro Amari
(74) *Attorney, Agent, or Firm*—Frommer Lawrence & Haug, LLP; William S. Frommer; Thomas F. Presson

(57) ABSTRACT

A holographic recording device for multiple recording a plurality of interference fringes of a reference light and intensity-modulated signal lights in a same area or in areas slightly shifted each other of a holographic recording medium is disclosed. The holographic recording device modulates the intensity of a signal light and modulates a phase of the signal light before or after the intensity modulation. A phase distribution of each signal light is changed every time when multiple recording is performed and after each phase modulation, the recording device determines if an assigned multiplicity has been achieved.

11 Claims, 5 Drawing Sheets

(FIRST MULTIPLE RECORDING)

(SECOND MULTIPLE RECORDING)

(SECOND MULTIPLE RECORDING)

(SECOND MULTIPLE RECORDING)

HOLOGRAPHIC RECORDING DEVICE AND HOLOGRAPHIC RECORDING METHOD

CROSS REFERENCES TO RELATED APPLICATIONS

The present invention contains subject matter related to Japanese Patent Application JP 2005-208817 filed in the Japanese Patent Office on Jul. 19, 2005, the entire contents of which being incorporated herein by reference.

BACKGROUND OF THE INVENTION

1. Field of the Invention

The present invention relates to a holographic recording device for recording interference fringes of 2 light beams on a holographic recording medium and a holographic recording method and, in particular, to a reduction of noise caused at a recording time of current interference fringes by preliminarily recorded interference fringes.

2. Background Art

A holographic data storage system for recording/reproducing a large amount of data by utilizing the holographic technology has been proposed recently. In such holographic data storage system, a multiple recording system is used in order to improve the recording density. In the holographic data storage system, a number of independent pages are recorded in one area. Typical examples of the multiple recording system are the angle-multiple recording system, the shift-multiple recording system and the phase-code multiple recording system and various other systems such as the speckle-multiple recording system are also known. When such multiple recording system is used, the recording capacity of the holographic data storage system becomes substantially large according to calculations. However, it is impossible in the existing circumstances to increase the capacity due to noise caused by previous interference fringe recording.

In recording data by using holographic technology, intensity of light on a holographic recording medium is large in the vicinity of an origin of the medium and light intensity on other areas is small as shown in FIG. 5. Incidentally, the high intensity component in the vicinity of the origin is called DC component. Such uneven distribution of light intensity is known as the DC component problem when a spatial light modulator (SLM), which performs only intensity-modulation is used. It is also known that, with such unevenness of light intensity distribution, various problems occur in a recording time and some countermeasures have been proposed in, for example, a publication "Holographic Data Storage; H. J. Coufal, D. Psaltis, G. T. Sincerbox ED; Springer; p. 259-269 Beam Conditioning Techniques for Holographic Recording Systems".

One of the countermeasures is a method using a random phase mask or a phase-diffusion plate. In the method using the random phase mask as a phase diffusion plate, light is diffused by an optical element, which has, for example, a pitch identical to a pixel pitch of a SLM and a random pattern having phase-difference of 0 and $\pi$, correspondingly to the pixels of the SLM. This optical element having a random pattern having phase-difference of 0 and $\pi$ is called the phase-diffusion plate. When light is diffused by the phase-diffusion plate, the light distribution on the recording medium becomes uniform and the recording characteristics are substantially improved. However, it is known that, although the problem of the DC component is solved by using the phase-diffusion plate, noise of an image is increased as described in page 264 of the above mentioned publication.

One of causes of noise will be described. As shown in FIG. 6A and FIG. 6B, in the angle-multiple recording, interference fringes formed by signal lights and a reference light are recorded in a same recording area of a holographic recording medium 50 while changing an incident angle of the reference light with respect to the recording medium. In FIG. 6A, interference fringes of the signal light 101 and the reference light 201 is recorded in the holographic recording medium 50, which is referred to as a first multiple recording, and, in FIG. 6B, interference fringes of the signal light 102 and the reference light 202 is recorded in the holographic recording medium 50, which is referred to as a second multiple recording. When the multiple recording is performed, both a recording signal and various noises are recorded. One of the causes of various noises will be described.

In FIG. 7, a reference numeral 4-1 shows interference fringes of the signal light 101 and the reference light 201 and a reference numeral 4-2 shows interference fringes of the signal light 102 and the reference light 202. These two interference fringes are indispensable primarily. On the other hand, the reason why unnecessary interference fringes are produced will be described with reference to FIG. 8. After the interference fringes 4-1 are recorded first on the holographic recording medium 50, the interference fringes 4-2 are recorded on the holographic recording medium 50 by irradiating the holographic recording medium 50 with the signal light 102 and the reference light 202. In this case, when irradiation with the signal light 102 is performed, the signal light 102 is diffracted by the interference fringes 4-1 recorded firstly on the holographic recording medium 50. When the signal light 101 and the signal light 102 are identical completely, light identical to the reference light 201 may be generated by this diffraction. The light identical to the reference light 201 thus generated is diffracted again by the interference fringes 4-1 recorded firstly, resulting in a light identical to the signal light 101. The light identical to the signal light 101 thus generated interferes with the reference light 202. As a result, unnecessary interference fringes 5-1 are recorded together with the interference fringes 4-2. Incidentally, although it is assumed in this description that the signal light 101 and the signal light 102 are completely identical, the light identical to the reference light 201 is practically generated with intensity proportional to mutual correlation of these signal lights.

SUMMARY OF THE INVENTION

As described, when the interference fringes 4-1 and 4-2 are recorded in the holographic recording medium 50 by the angle-multiple recording system, the unnecessary interference fringes 5-1 are recorded together. When the holographic recording medium 50 having the interference fringes 4-1, 4-2 and 5-1 recorded is reproduced by irradiating it with a reference signal identical to the reference signal 202, unnecessary signal light 101, which is the diffracted light of the interference fringes 5-1, is reproduced together with the necessary signal light 102 as noise component. When n-th signal light is recorded in the holographic recording medium 50 by the angle-multiple recording system, the above mentioned phenomenon occurs in respective steps of multiple exposure, so that a number of noise components are added, resulting in substantial reduction of S/N ratio of reproduced data.

It is desirable to provide a holographic recording device and a holographic recording method capable of reducing noise by reducing possibility of recording unnecessary interference fringes together with aimed interference fringes when the multiple recording of data is performed and obtaining reproduced data having good S/N ratio.

According to an embodiment of the present invention, a holographic recording device for recording a plurality of interference fringes of a reference light and signal light, intensity of which are modulated, in a same area or in slightly shifted areas of a holographic recording medium includes phase modulation means for modulating phase of a signal light before or after the intensity modulation and control means for modulating phase distributions of signal lights used in performing the multiple recording such that the phase distributions are made mutually different by changing a phase distribution of the phase modulation means every time the multiple recording is performed.

In the holographic recording device, the phase distribution of the phase modulation means may be changed such that the phase correlation between signal lights, which are used every time when the multiple recording is performed, is lowered or reduced to substantially zero.

The phase modulation means may be a phase modulating optical element close adhered to or provided in the vicinity of a spatial modulator for intensity-modulating the signal light or a phase modulating optical element provided in a position in a focusing relation to the spatial modulator of a signal light optical system.

As such, noise is caused by recordation of unnecessary signal (interference fringes) corresponding to a correlation between a signal light, which is to be recorded in a certain page and incident on the holographic recording mediums, and a signal light, which was previously used in data recording. Therefore, it is possible to reduce recording noise by changing condition for phase modulation of signal light by the phase modulation means every time when the multiple recording is performed for a page such that phases of signal lights used in respective multiple recording of the page are made different each other to reduce the correlation and possibility of recording of unnecessary signal is reduced. Ideally, it is desirable that the phase correlation between signal lights used for recording of respective pages becomes zero. In such case, it is possible to substantially eliminate the recording noise. Practically, it is possible to make the phases between signal lights used in respective multiple recording different by performing the recording while moving the phase modulation optical element, as the phase modulation means, every page recording.

According to the embodiment of the invention, phase-modulation state of signal light is changed every time of multiple recording to reduce or eliminate the correlation between signal lights used in respective multiple recording lower or become zero, thereby reducing possibility of recording of unnecessary fringes in addition to the aimed fringes at the time of multiple recording and thus reducing the recording noise. Therefore, it is possible to obtain reproduced data having good S/N ratio.

Further, since noise is suppressed, good S/N can be obtained even when multiplicity is increased, so that it is possible to improve the recording capacity of holographic storage.

Further, due to the reduction of noise, it is possible to increase information amount for 1 page to thereby improve transfer rate of data.

DESCRIPTION OF THE PREFERRED EMBODIMENT

The present invention enables to reduce possibility of recording of unnecessary fringes in addition to the aimed fringes at the time of multiple recording to attain reproduction data having good S/N ratio by changing phase modulation state of signal light every multiple recording such that phase distributions of respective signal lights used in recording hologram on a recording medium are different mutually to reduce or to eliminate the correlation between signal lights used in the multiple recording.

Embodiment 1

Figure 1:
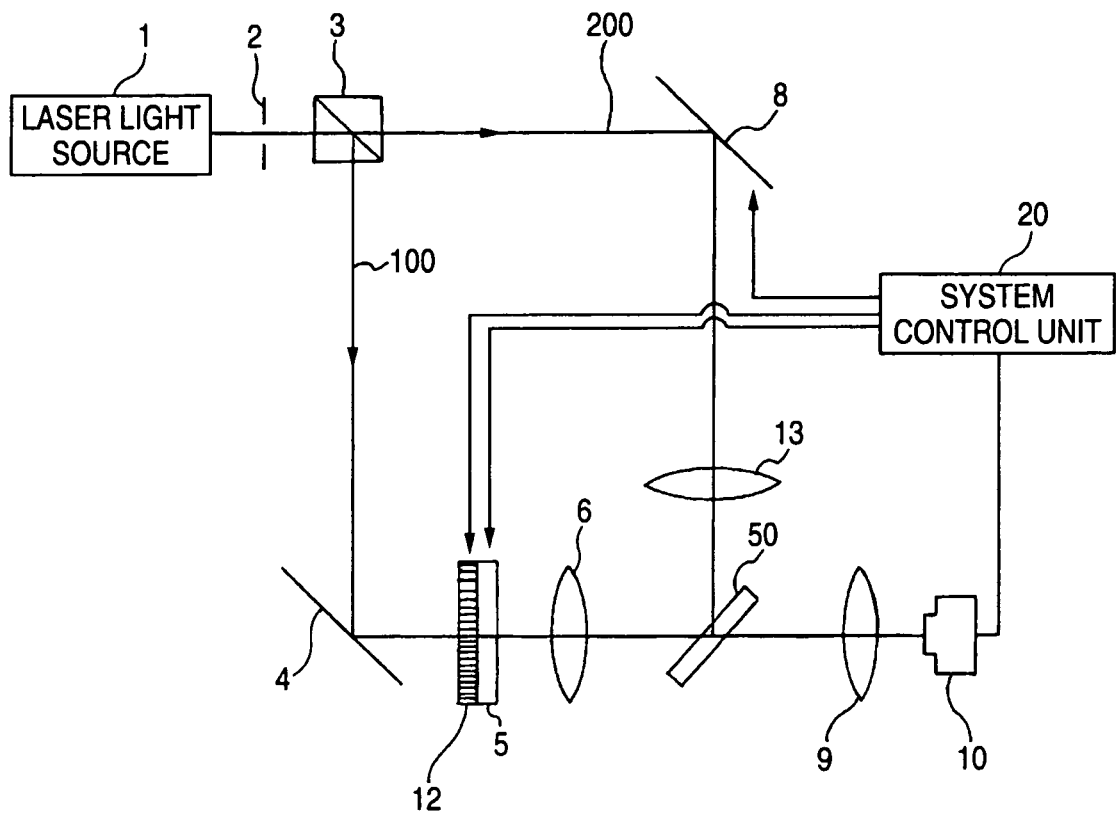
FIG. 1 shows a construction of a holographic recording device according to an embodiment of the present invention schematically.

FIG. 1 schematically shows a construction of a holographic recording device according to an embodiment of the present invention. The holographic recording device is constructed with a laser light source 1 for generating laser light, a shutter 2, a beam splitter 3, a mirror 4, a phase modulating optical element 12, a spatial light modulator (SLM) 5, a lens 6 constructing a signal light optical system, a rotary mirror 8, a lens 13 constructing a reference light optical system, a lens 9 constructing a reproducing optical system, an image pickup device 10 and a system control unit 20 for controlling a recording/reproducing operation and an operation of the whole recording device. Incidentally, the system control unit 20 performs various controls such as movement of the phase modulating optical element in performing the angle multiple recording, display of data page with respect to the spatial light modulator 5 and change of rotation angle of the rotary mirror 8, etc. In the following description, however, individual control operations of the system control unit 20 are not described in detail except the recording/reproducing operation.

Now, the recording/reproducing operation according to this embodiment will be described. Coherent laser light emitted from the laser light source 1 is incident on the beam splitter 3 through the shutter 2 and split by the beam splitter 3 to a signal light 100 and a reference light 200. The signal light 100 is reflected by the mirror 4 and incident on the spatial light modulator 5 through the phase modulating optical element 12. The signal light 100 is phase-modulated by the phase modulating optical element 12 and intensity-modulated by the spatial light modulator 5 displaying a page. The thus modulated signal light is condensed on the holographic recording medium 50 through the lens 6. On the other hand, the reference light 200 is reflected by the rotary mirror 8 and irradiates the holographic recording medium 50 through the lens 13. Therefore, the signal light 100 and the reference light 200 are overlapped in the holographic recording medium 50 and the resulting interference fringes re recorded on the holographic recording medium 50. Data is angle multiple recorded in the same recording area (book) of the holographic recording medium 50 by changing the data page to be displayed on the spatial modulator 5 and the phase distribution of the phase modulation optical element 12 every time when the incident angle onto the holographic recording medium 50 is changed by changing the rotation angle of the rotary mirror 8.

In reproducing data multiple recorded on the holographic recording medium 50, data is reproduced as a diffracted light corresponding to the interference fringes recorded on the holographic recording medium 50 by a reproduced light, which is identical to the reference light 200, incident on the holographic recording medium 50 and the diffracted light (reproduced light) is focused on the image pickup device 10 such as a CCD image sensor or a CMOS image sensor by the lens 9. The image pickup device 10 converts the diffracted light opto-electrically to obtain a receiving signal and the receiving signal is analyzed by the system control unit 20 and reproduced as an image data. In reproducing the image data, the multiple recorded data are reproduced sequentially every time the incident angle of the reference light 200 to the holographic recording medium 50 is changed by rotating the rotary mirror 8.

Figure 2:
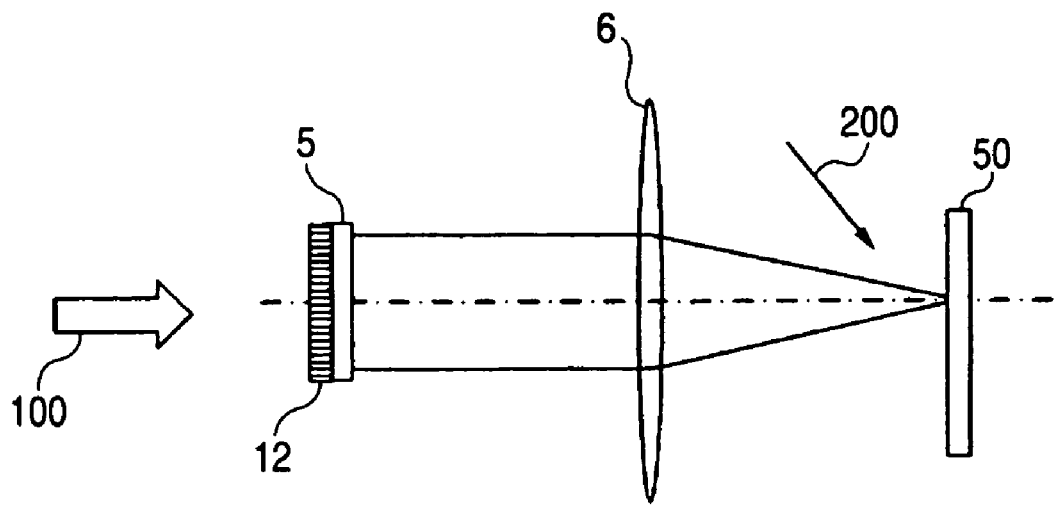
FIG. 2 illustrates an example of an arrangement of a phase modulating optical element shown in FIG. 1.
Figure 3:
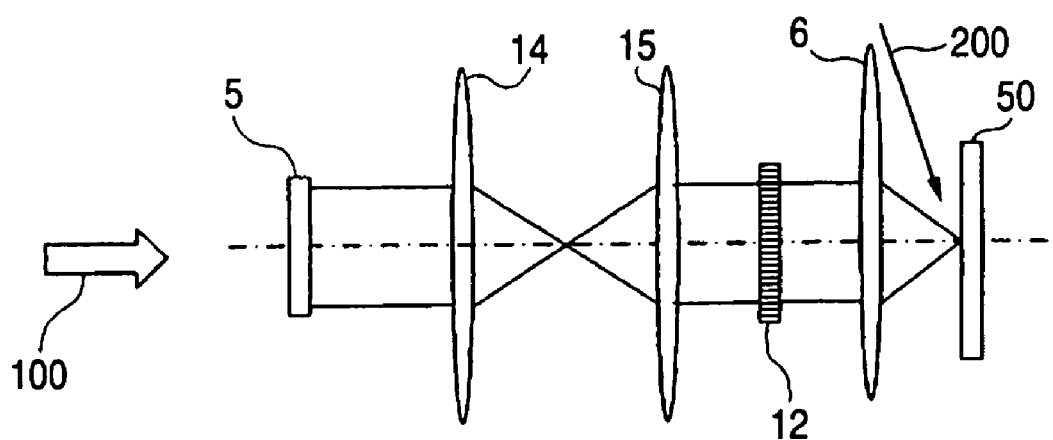
FIG. 3 illustrates another example of the arrangement of the phase modulating optical element shown in FIG. 1.

In the above embodiment, when the data is multiple recorded, the phase of the signal light 100 is changed by the phase modulation optical element 12. This will be described. As shown in FIG. 2, the phase modulating optical element 12 may be provided very close to the SLM 5 or may be provided in a position in which the signal light passed through the SLM 5 is focused within the signal light optical system by lenses 14 and 15 of 4f system as shown in FIG. 3. In either case, the signal light 100 is phase-modulated by the phase modulating optical element 12 every time of multiple recording such that phase relation between signal lights become different from each other.

Figure 6A:
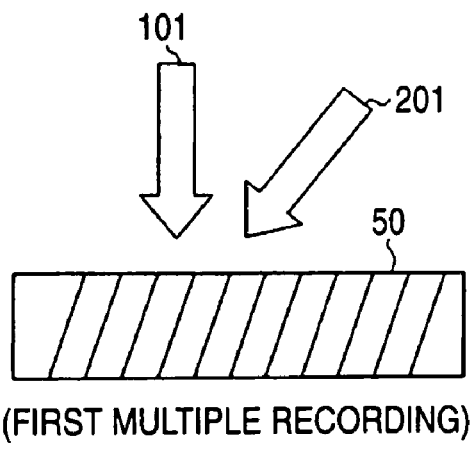
FIGS. 6A and 6B illustrate interference fringes of a signal light and a reference light, which is recorded by angle multiple recording.
Figure 6B:
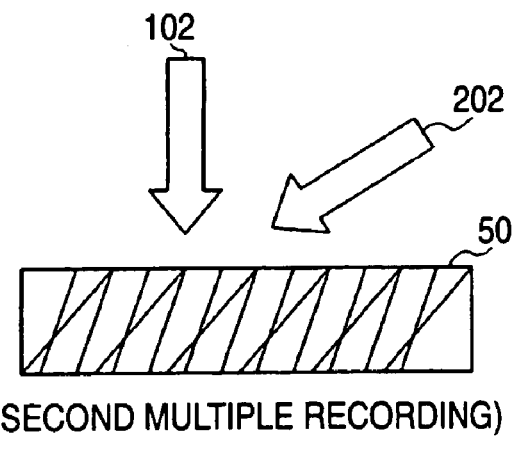
Figure 7:
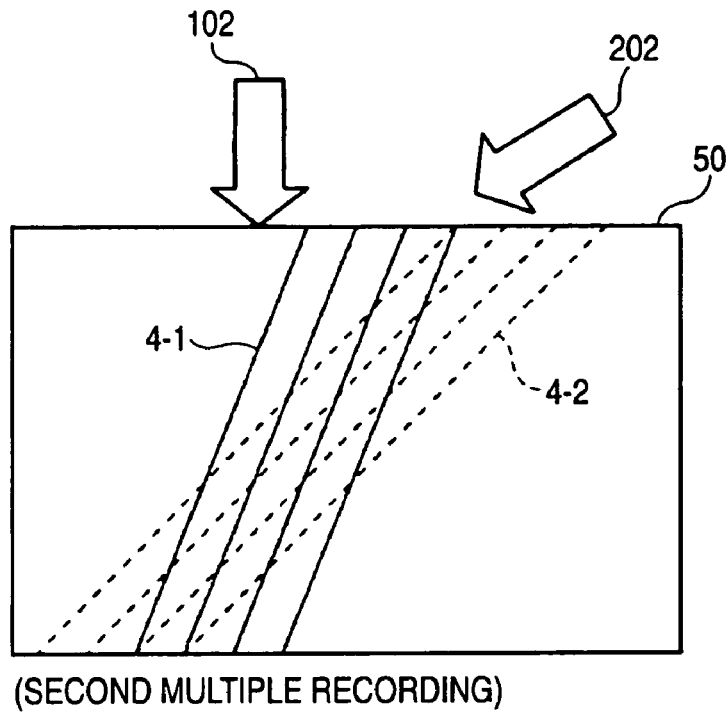
FIG. 7 illustrates a recording of interference fringes on the holographic recording medium on which interference fringes have already been recorded.
Figure 8:
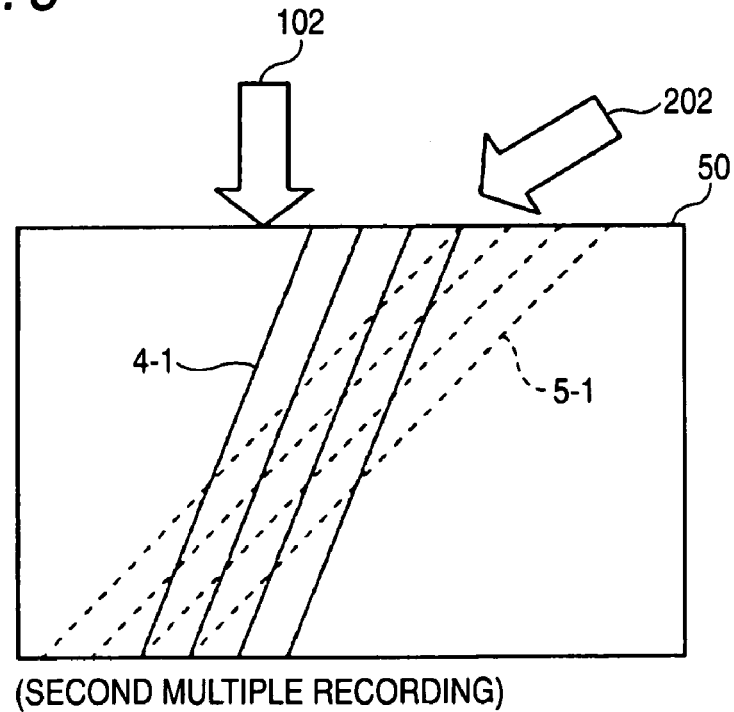
FIG. 8 illustrates unnecessary interference fringes recorded on the holographic recording medium by angle-multiple recording.

Accordingly, the phases of the signal lights 101 and 102 in FIG. 6B, which are modulated by the phase modulating optical element 12, are different from each other. Therefore, when, in order to record a next data page, the holographic recording medium 50 is irradiated with the signal light 102 and the reference light 202 after the interference fringes 4-1 of the signal light 101 and the reference light 201 is recorded on the holographic recording medium 50 by angle-multiple as shown in FIG. 7, the signal light 102 is diffracted by the already recorded interference fringes 4-1. However, since the phase distributions of the signal lights 101 and 102 are different, the correlation between them is very small or zero. Therefore, intensity of light identical to the reference light 201 and generated due to diffraction by the interference fringes 4-1 is very small or zero. Accordingly, intensity of light identical to the reference signal light 101 and generated due to diffraction by the interference fringes 4-1 is very small or zero. Thus, it can be said that intensity of the interference fringes (noise) 5-1 of the signal light 101 and the reference light 202 is very small or zero. Consequently, the signal light 102 is reproduced without substantial noise, which is light identical to the signal light 101, even when the holographic recording medium 50 is irradiated with the reference light 202 for reproduction.

Figure 4:
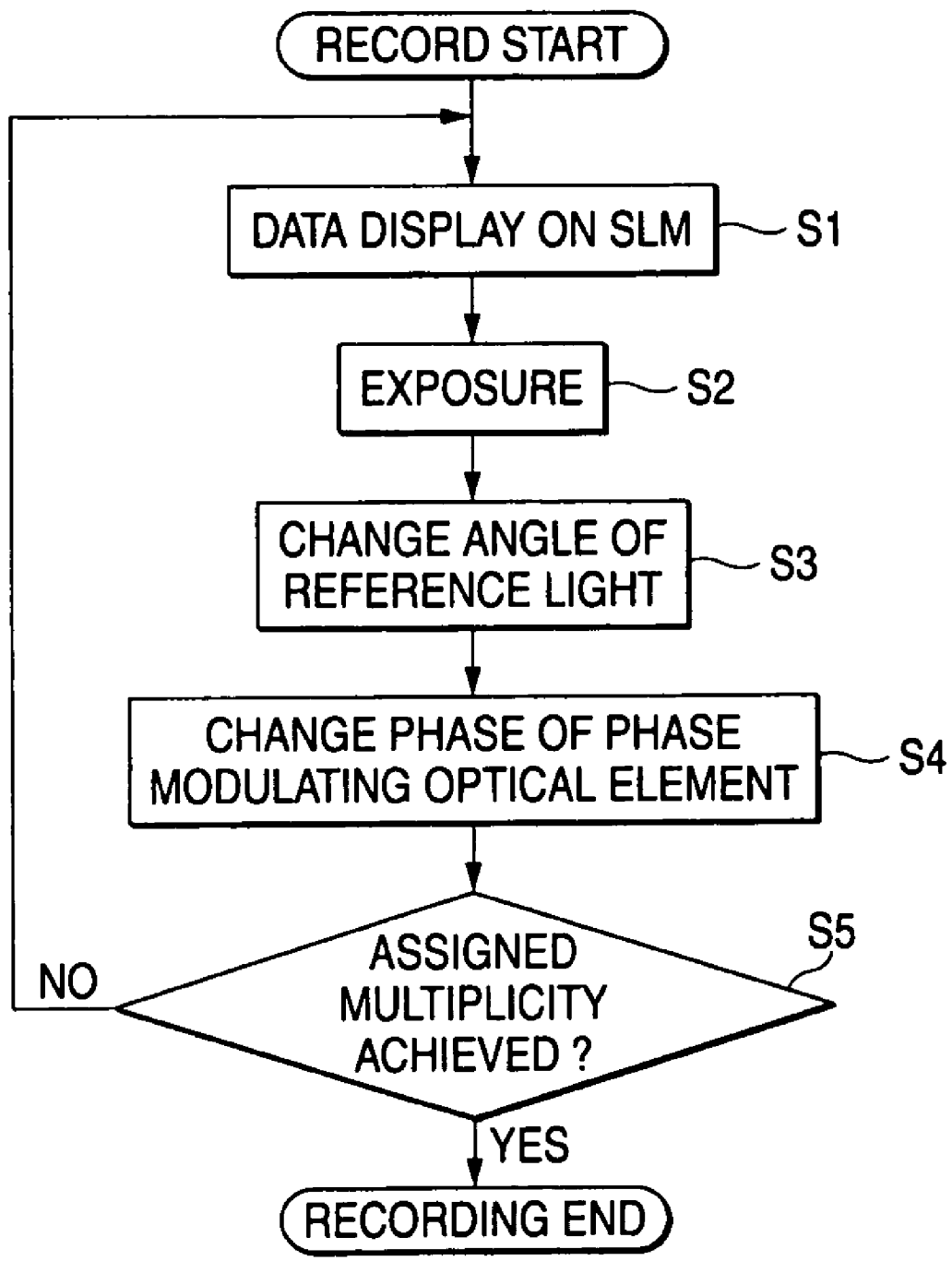
FIG. 4 is a flowchart showing a recording control procedure of a system control unit shown in FIG. 1.
Figure 5:
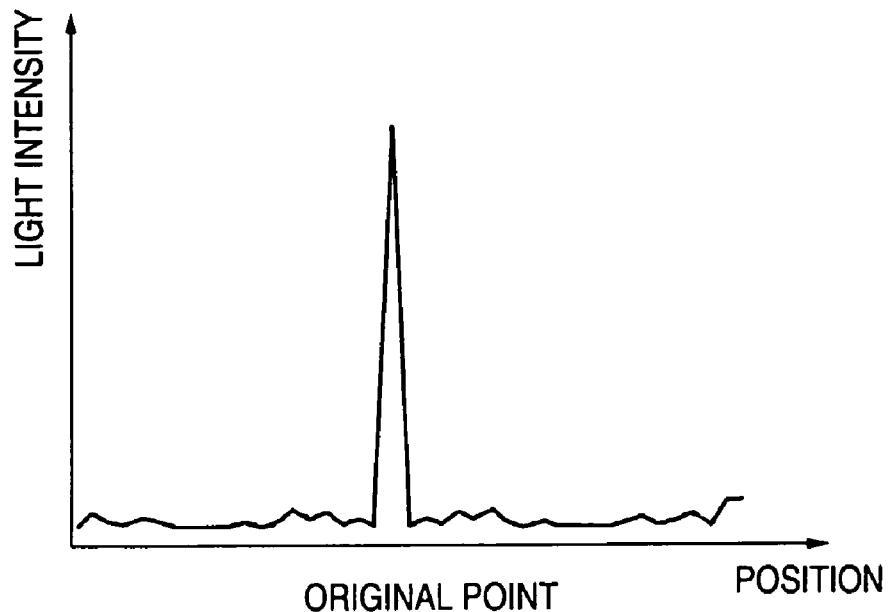
FIG. 5 is a characteristics curve showing a light intensity distribution on a holographic recording medium.

FIG. 4 is a flowchart showing a recording control procedure of a system control unit 20 shown in FIG. 1. After the system control unit 20 displays the data page on the SLM 5 in the step S1, irradiates the holographic recording medium 50 with the signal light 100 and the reference light 200 to expose the medium by opening the shutter 2 in the step S2. Thereafter, the system control unit 20 closes the shutter 2 and changes the angle of the rotary mirror 8 to change the incident angle of the reference light 200 to the holographic recording medium 50 in the next exposure in the step S3 and then, rotates the phase modulation optical element 12 to change the phase of the signal light 100 by phase-modulating the signal light 100 in the step S4. Thereafter, the control unit 20 determines whether or not the assigned multiplicity is achieved in the step S5. When the assigned multiplicity is not achieved, the procedure is returned to the step S1 and the procedures in the steps S1 to S5 are repeated to perform the angle-multiple recording in one book. When it is determined in the step S5 that the assigned multiplicity is achieved, the recording operation for the same book is ended.

According to this embodiment, by changing phase of the signal light 100 by the phase modulating optical element 12 every time when the angle-multiple recording is performed, the correlation between the signal lights 100 in every data page to be angle-multiple recorded becomes very small or substantially zero, so that intensity of pseudo signal light other than the signal lights to be recorded becomes very small or substantially zero. Therefore, it is possible to substantially reduce noise in recording.

Incidentally, the present invention is not limited to the described embodiment and can be embodied in other various manners in concrete construction, function, operation and advantage within the scope of the present invention. For example, the phase modulating optical element 12 may be an SLM (random phase mask) using a phase modulation type liquid crystal panel or an SLM using surface irregularity or variation of refractive index. In the case of the phase modulating optical element 12 using the surface irregularity or the variation of refractive index, various elements of 2 gradation, other gradation and even continuous gradation may be used. As a practical method for making the phase correlation of every data page substantially zero, it can be realized by combining a phase modulation type liquid crystal panel and a Hadamard code, which is used in the phase-code multiple recording. Alternatively, it is possible to make the phase correlation between data pages substantially zero by using a fixed phase mask having random surface irregularity while moving the fixed phase mask.

In order to solve the problem of the DC component of the signal light most simply, a binary random phase mask having the same (or integer multiple) pitch as the pixel pitch of the SLM displaying data page may be used. When such phase mask is used in the present invention, it is possible to prevent a reduction of dynamic range of the recording medium due to the DC component and to reduce noise in recording. However, when the moving phase mask is used to reduce noise, it is necessary to move it by a distance, which is exactly an integer multiple of the pixel pitch, so that a high precision is required. Therefore, it is preferable to use a phase mask having no pixel structure. An example of such phase mask may be a mask having continuous value.

Further, although the example applied to the holographic recording medium of the angle-multiple system in the described embodiment is described, the similar advantage can be obtained by applying various multiple system such as speckle-multiple system and a phase-code multiple system.

It should be understood by those skilled in the art that various modifications, combinations, sub-combinations, alternations may occur depending on design requirements and other factors insofar as they are within the scope of the appended claims or the equivalents thereof.

What is claimed is:

1. A holographic recording device for multiple recording a plurality of interference fringes of a reference light and intensity-modulated signal lights in a same area or in areas slightly shifted each other of a holographic recording medium, comprising:

a spatial light modulator for modulating an intensity of the signal light;

phase modulation means for modulating phase of the signal light before or after the intensity modulation; and control means for modulating phases of the signal lights used in performing the multiple recording such that the phases of the signal lights are different from each other by changing a phase distribution of said phase modulation means every time when the multiple recording is performed, wherein the control means determines, after each phase modulation, whether an assigned multiplicity is achieved.

2. A holographic recording device as claimed in claim 1, wherein the phase distribution of said phase modulation means is changed every time when the multiple recording is performed such that a phase correlation between the signal lights used in performing the multiple recording is reduced.

3. A holographic recording device as claimed in claim 1, wherein said phase modulation means is a phase modulating optical element close adhered to or provided in the vicinity of a spatial modulator for intensity-modulating the signal lights or a phase modulating optical element provided in a position in a focusing relation to said spatial modulator of a signal light optical system.

4. A holographic recording device as claimed in claim 3, wherein said phase modulation optical element changes phases of the signal lights by changing surface irregularity or refractive index thereof.

5. A holographic recording device as claimed in claim 3, wherein said phase modulating optical element is a random phase mask capable of displaying various patterns having different phase distributions and changes the phases of the signal lights by patterns displayed.

6. A holographic recording device as claimed in claim 5, wherein said control means changes phase distributions of said phase modulation means by controlling a pattern displayed on said random phase mask.

7. A holographic recording device as claimed in claim 3, wherein said phase modulation optical element has no pixel structure.

8. A holographic recording device as claimed in claim 3, wherein said control means changes phase distributions of said phase modulation means by controlling a positional movement of said phase modulating optical element.

9. A holographic recording device as claimed in claim 1, wherein the multiple recording is an angle-multiple recording.

10. A holographic recording method for recording a plurality of interference fringes of a reference light and intensity-modulated signal lights in a same area of a holographic recording medium or in areas slightly shifted each other, comprising:

modulating an intensity of the signal light;

changing a phase modulation state of a signal light every time the multiple recording is performed such that phases of the signal lights used in performing the multiple recording become different from each other; and determining, after each phase modulation, whether an assigned multiplicity is achieved.

11. A holographic recording device for multiple recording a plurality of interference fringes of a reference light and intensity-modulated signal lights in a same area or in areas slightly shifted each other of a holographic recording medium, comprising:

a spatial light modulating unit for modulating an intensity of the signal light;

a phase modulation unit that modulates phase of the signal light before or after the intensity modulation; and a control unit that modulates phases of the signal lights used in performing the multiple recording such that the phases of the signal lights are different from each other by changing a phase distribution of said phase modulation means every time when the multiple recording is performed, wherein the control unit determines after each phase modulation, whether an assigned multiplicity is achieved.

* * * * *